US008699459B2

(12) United States Patent
Jung et al.

(10) Patent No.: US 8,699,459 B2
(45) Date of Patent: Apr. 15, 2014

(54) APPARATUS AND METHOD FOR SUPPORTING HANDOVER IN A MULTI-CARRIER COMMUNICATION SYSTEM (75) Inventors: In-Uk Jung, Gyeonggi-Do (KR); Young-Soo Yuk, Gyeonggi-Do (KR); Yong-Ho Kim, Gyeonggi-Do (KR); Ki-Seon Ryu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 237 days.

(21) Appl. No.: 13/060,684

(22) PCT Filed: Aug. 26, 2009

(86) PCT No.: PCT/KR2009/004768
§ 371 (c)(1),
(2), (4) Date: Feb. 24, 2011

(87) PCT Pub. No.: WO2010/024591
PCT Pub. Date: Mar. 4, 2010

(65) Prior Publication Data
US 2011/0149912 A1    Jun. 23, 2011

Related U.S. Application Data (60) Provisional application No. 61/092,389, filed on Aug. 27, 2008.

(30) Foreign Application Priority Data

Aug. 12, 2009  (KR) .......................... 10-2009-0074408

(51) Int. Cl.
*H04W 4/00* (2009.01)
(52) U.S. Cl.
USPC .......................................... 370/331; 455/437

(58) Field of Classification Search
USPC ........................ 370/310–350; 455/432.1–444
See application file for complete search history.

(56) References Cited

U.S. PATENT DOCUMENTS

| 6,018,662 | A  | * | 1/2000 | Periyalwar et al. ........... 455/442 |
| 2005/0096051 | A1 | | 5/2005 | Lee et al. |

(Continued)

FOREIGN PATENT DOCUMENTS

| KR | 10-2007-0006653 A | 1/2007 |
| KR | 10-2008-0026855 A | 3/2008 |
| KR | 10-2008-0047735 A | 5/2008 |

*Primary Examiner* — Ricky Ngo
*Assistant Examiner* — Wei-Po Kao
(74) *Attorney, Agent, or Firm* — Lee, Hong, Degerman, Kang & Waimey (57) ABSTRACT A method for a handover in a wireless access system supporting multi-carrier operation includes transmitting a handover request message to a serving base station (BS) assigning multi-carriers to the MS through a primary carrier, the multi-carriers including the primary carrier and at least one secondary carrier; receiving, from the serving BS, a handover response message including a BS list and temporary carrier information indicating one of the at least one secondary carrier as a temporary carrier; transmitting, to a target BS selected from the BS list, a ranging request message for synchronizing with the target BS through the temporary carrier while maintaining link connection with the serving BS using the multi-carriers excluding the temporary carrier; receiving, from the target BS, a ranging response message through the temporary carrier; and transmitting, to the serving BS, a handover indication message indicating completion of the handover through the primary carrier.

16 Claims, 3 Drawing Sheets

(56) References Cited

U.S. PATENT DOCUMENTS

| | | | |
|---|---|---|---|
| 2005/0192011 A1* | 9/2005 | Hong et al. | 455/440 |
| 2006/0009224 A1* | 1/2006 | Lim et al. | 455/442 |
| 2007/0121539 A1* | 5/2007 | Kikuchi | 370/328 |
| 2008/0051086 A2* | 2/2008 | Etemad et al. | 455/436 |
| 2009/0054066 A1* | 2/2009 | Jang et al. | 455/436 |
| 2009/0111470 A1* | 4/2009 | Thakare | 455/436 |

* cited by examiner

APPARATUS AND METHOD FOR SUPPORTING HANDOVER IN A MULTI-CARRIER COMMUNICATION SYSTEM

CROSS-REFERENCE TO RELATED APPLICATIONS

This application is the National Stage filing under 35 U.S.C. 371 of International Application No. PCT/KR2009/004768, filed on Aug. 26, 2009, which claims the benefit of earlier filing date and right of priority to Korean Patent Application No. 10-2009-0074408, filed on Aug. 12, 2009, and also claims the benefit of U.S. Provisional Application Ser. No. 61/092,389, filed on Aug. 27, 2008, the contents of which are all hereby incorporated by reference herein in their entirety.

TECHNICAL FIELD

The present invention relates to a method for supporting handover in a multi-carrier communication system and an apparatus thereof, and more particularly, to a method capable of performing a handover procedure to a target base station (BS) using a currently-not-used carrier while maintaining a link connection for transmitting and/or receiving data to and/or from a serving base station, and an apparatus thereof.

BACKGROUND ART

With the development of the communication technology, services provided by a mobile communication system are being gradually developed into packet data transmission and/or reception services, multimedia broadcasting services, and the like, as well as voice communication services.

In the third generation services, such as WCDMA, high capacity data as well as voice can be transmitted and received at a high transmission rate, and furthermore, the standardization work is actively carried out, such as long-term evolution network (LTE), IEEE 802.16m, and the like, in order to make an evolved network having a wider bandwidth, considering a rapid increase of data traffic in the future.

In particular, IEEE 802.16m, for which its standardization work is actively carried out, has set a goal to develop a standard specification satisfying the requirement of an IMT-Advanced system while maintaining compatibility with 802.16-based terminals and base station equipment. In the IMT-Advanced system, above all, more than 40 MHz of broadband communication service support is required, and in IEEE 802.16m, broadband communication support is also essential to satisfy the requirement of the IMT-Advanced system. However, it is in fact difficult to define a standard for all bandwidths, and as a result, a communication system using a multi-carrier approach that supports broadband using a plurality of carriers is under discussion. In the multi-carrier system, discussed under IEEE 802.16m, it is possible to transmit and/or receive data between a terminal and a base station by accessing to each other through at least two and more frequency assignments (FAs) at the same time, and therefore, it has an advantage that high-capacity, high-speed data transmission and reception is possible compared to the existing single-carrier approaches. Also, it has a feature that communication is possible using a broader bandwidth from the standpoint of a mobile station (MS) depending on circumstances, and more users can be accommodated from the standpoint of a base station (BS).

In a system using a multi-carrier approach, as described above, a terminal generally transmits and/or receives data to and/or from a serving base station using all available carriers to obtain the maximum data transmission efficiency. In those circumstances, when such a circumstance occurs that a terminal should perform handover, it may cause a problem that a link connection with the serving base station should be terminated to perform handover since there exists no carrier for performing a handover procedure to a target base station while maintaining the link connection with the serving base station. Accordingly, the termination of the link connection with the serving base station for performing handover procedure with the target base station causes a handover delay time. Also it causes a problem that the quality of service (QoS), obtained by the terminal using a multi-carrier, cannot be continuously guaranteed.

DISCLOSURE OF INVENTION

Technical Problem

An object of the present invention is to provide a method and apparatus for supporting handover in which a handover procedure to a target base station is carried out while maintaining a link connection with the serving base station when performing handover in a communication system using a multi-carrier approach, thereby preventing the generation of a handover delay time and ensuring the QoS of a terminal.

Solution to Problem

In order to accomplish the foregoing object, according to a method for supporting handover in a system using a multi-carrier approach in accordance with an embodiment of the present invention, it is characterized, in a method for supporting handover in a multi-carrier communication system, that the method comprises transmitting a handover request message to a serving base station (BS) through a first carrier; receiving a handover response message including neighboring base station information and temporary carrier information capable of performing a handover procedure from the serving base station through the first carrier; selecting a target base station (BS) through the neighboring base station information received from the serving base station; transmitting a handover (HO) indication message indicating a handover to the target base station to the serving base station through the first carrier; transmitting a ranging request message for synchronizing an uplink channel with the target base station to the target base station through the temporary carrier; and receiving a ranging response message from the target base station.

In order to accomplish the foregoing object, according to a method for supporting handover in a system using a multi-carrier approach in accordance with another embodiment of the present invention, it is characterized in a method for supporting handover in a multi-carrier communication system including a terminal capable of concurrently processing multiple radio carriers, a serving base station (BS) capable of providing a service to the terminal through the multiple radio carriers, and a target base station to be handed over by the terminal, the method comprises in the serving base station, receiving a handover request message from the terminal through a first carrier; transmitting the handover request message to the target base station and receiving a response message for the handover request message from the target base station; transmitting, to the terminal, a handover response message comprises the target base station information and temporary carrier information capable of performing a handover procedure between the terminal and the target base station through the first carrier; and receiving, from the terminal, a handover (HO) indication message indicating a handover to the target base station through the first carrier; and the method comprises in the target base station, receiving a ranging request message for synchronizing an uplink channel with the terminal through the temporary carrier, wherein the terminal maintains normal communication with the serving base station on a carrier different with the temporary carrier; and transmitting a ranging response message for the ranging request message to the terminal through the temporary carrier.

In order to accomplish the foregoing object, according to a multi-carrier communication system in accordance with another embodiment of the present invention, it is characterized that the system, comprises a serving base station, receiving a handover request message from a terminal through a first carrier, transmitting the handover request message to a neighboring base station and receiving a response message for the handover request message from the neighboring base station, transmitting to the terminal a handover response message comprises the neighboring base station information and temporary carrier information through the first carrier; and receiving a handover (HO) indication message through the first carrier from the terminal; and a target base station, receiving a ranging request message for synchronizing an uplink channel with the terminal through the temporary carrier and transmitting a ranging response message to the terminal through the temporary carrier, wherein the serving base station maintains a link connection with the terminal on a carrier that is different with the temporary carrier while the terminal transfers the ranging request message and the ranging response message with the target base station through the temporary carrier.

Advantageous Effects of Invention

According to the present invention, when performing handover in a communication system using multiple radio carriers, a handover procedure to a target base station can be performed while maintaining a link connection with a serving base station as before. As a result, when performing handover, in case where a conventional single-carrier or even a multi-carrier approach is used, it produces an effect that a handover delay to the target base station, which is generated by releasing a link with the serving base station and then performing a handover procedure, can be prevented, and additionally the QoS obtained by using a multi-carrier approach can be continuously ensured.

BEST MODE FOR CARRYING OUT THE INVENTION

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, the term "terminal" is used, but the terminal may be also referred to as a subscriber station (SS), user equipment (UE), mobile equipment (ME), and a mobile station (MS). Furthermore, the terminal may be portable equipment having a communication function such as portable phone, PDA, smart phone, notebook, etc., or non-potable equipment such as PC, vehicle mounted device, etc.

Figure 1:
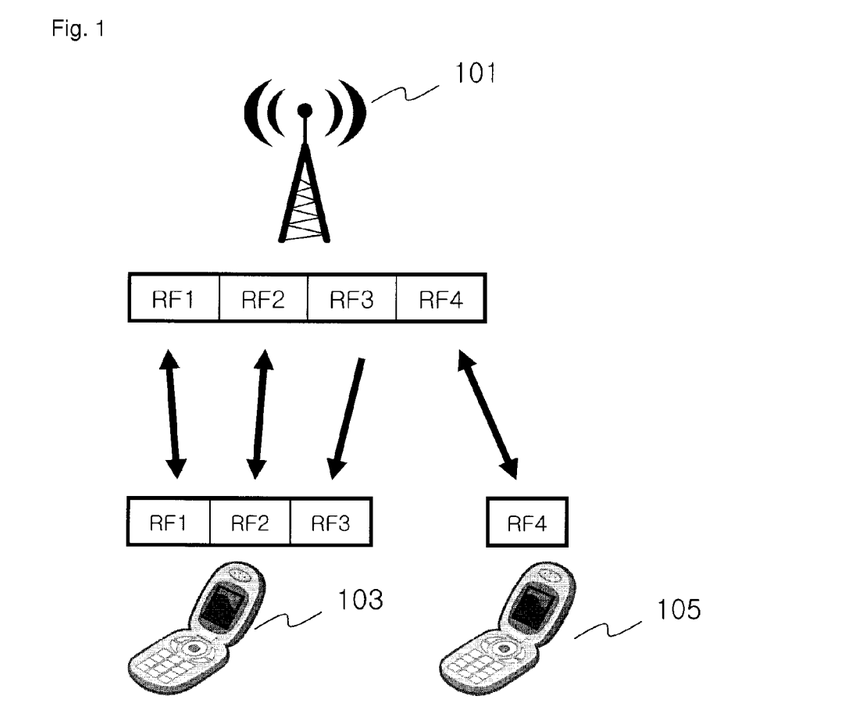
FIG. 1 shows a view illustrating a multi-carrier system according to an embodiment of the present invention.

FIG. 1 shows a view schematically illustrating a multi-carrier system according to an embodiment of the present invention.

As illustrated in FIG. 1, in a multi-carrier mode according to the present invention, the number of carriers allocated to terminals 103, 105 to be used for data transmission and/or reception, or the like, may be at least two or more. According to an embodiment, for the sake of convenience of explanation, it will be described below a case where four carriers RF1, RF2, RF3 and RF4 are used. The base station 101 may allocate multiple carriers RF1, RF2, and RF3 for a terminal 103 to be used in a multi-carrier mode, and a carrier RF4 may be also allocated to another terminal 105 from the base station 101. In this case, the terminal 103 operates in a multi-mode by using one or more carriers, and the terminal 105 operates in a single-mode by using only one carrier.

From the standpoint of the base station 101, multi-carrier types can be divided into two kinds of groups, a fully configured carrier (hereinafter, "FCC"), and a partially configured carrier (hereinafter, "PCC"). The FCC is defined as a carrier capable of transmitting and/or receiving uplink/downlink data and control information, and the PCC as a carrier capable of transmitting only downlink data to a terminal. Accordingly, the PCC may be applicable to a carrier that can be mainly used in a Multimedia Broadcast Multicast Service (MBMS), and the like. Referring to FIG. 1, RF1 and RF2, among the carriers allocated to the terminal 103, correspond to the FCC capable of transmitting and/or receiving uplink/downlink data and terminal control information. RF3, allocated to the terminal 103, corresponds to the PCC capable of transmitting downlink data only from a base station to a terminal. The carrier RF4, allocated to the terminal 105, corresponds to the FCC capable of transmitting and/or receiving uplink/downlink data and terminal control information. In case of a single-mode type such as the terminal 105, the allocated carrier is preferably allocated in a FCC type.

From the standpoint of the terminals 103, 105, the types of carrier allocated from a base station can be divided into two kinds of groups, a primary carrier and a secondary carrier. Preferably, one primary carrier and a plurality of secondary carriers can be allocated to a terminal from a base station. The primary carrier can transmit and/or receive data traffic and PHY/MAC control information between a terminal and a base station. The primary carrier mainly used for a control function such as network entry of a terminal. Furthermore, the secondary carrier can be allocated to a terminal based upon a resource allocation command of the base station, and is mainly used as a carrier for transmitting and/or receiving data traffic. However, the secondary carrier may be also used as a channel for transferring specified control information between a base station and a terminal in order to perform a multi-carrier operation.

Referring to FIG. 1, among the carriers allocated to the terminal 103, RF1 or RF2 may become a primary carrier, and RF3 becomes a secondary carrier. Similarly, RF4, allocated to the terminal 105, functions as a primary carrier. As illustrated in FIG. 1, in a multi-carrier system, it is possible at the same time to support the terminal 103 supporting a multi-carrier approach and the terminal 105 supporting a single-carrier approach only, and the terminal 103 supporting a multi-carrier approach can be also used as a single-mode using a single-carrier approach based upon data traffic. However, even if it is used as a multi-mode or single-mode, at least one carrier should be allocated. Here, the relevant carrier functions as a primary carrier when only one carrier is allocated.

The primary carrier of a terminal is a FCC-type defined by a base station, and a carrier that has performed an initial network entry procedure will be determined as a primary carrier. The secondary carrier can be set to a FCC- or PCC-type, and it can be allocated additionally based upon a request or instruction of the terminal or base station. Preferably, the terminal can transmit and/or receive all control information and secondary carrier information through a primary carrier, and mainly receive downlink data through a secondary carrier. Furthermore, an FCC-type secondary carrier allocated for a terminal, may be allocated as a primary carrier of another terminal.

Figure 2:
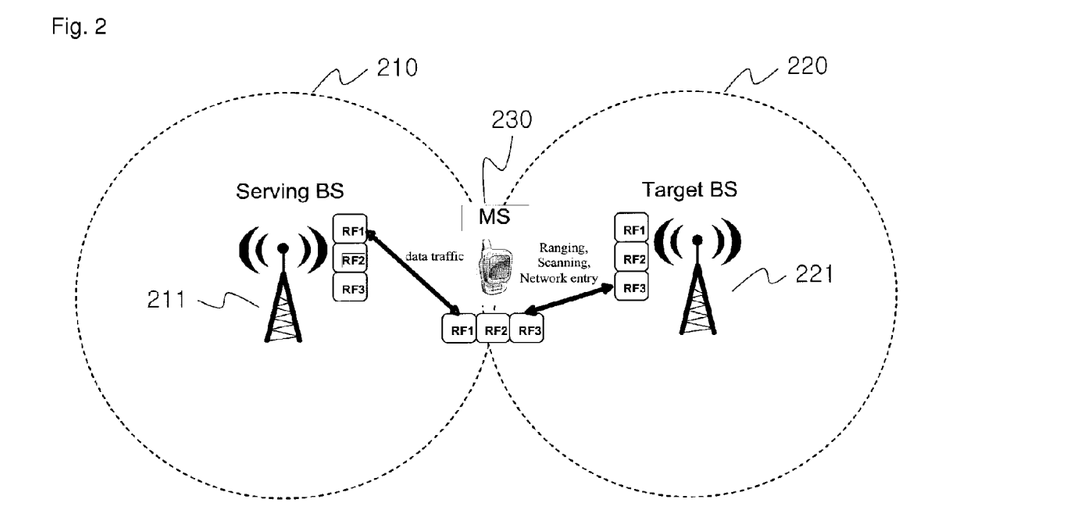
FIG. 2 shows a view schematically illustrating handover between cells in a multi-carrier system according to an embodiment of the present invention.

FIG. 2 shows a view schematically illustrating handover between cells in a multi-carrier system according to an embodiment of the present invention.

Assuming that a terminal 230 is moving into an adjacent cell 220 from a serving cell 210, the terminal 230 receives a data traffic service from a serving BS 211 through RF1. The RF2 and RF3 are in an idle state. Accordingly, through RF2 or RF3, currently in an idle state, the terminal 230 may perform all sorts of procedures required for scanning, ranging, authentication, and network entry, which are required for performing handover to a target base station 221. Referring to FIG. 2, the terminal 230 may transmits and/or receives ranging messages for handover to and/or from the target base station 221 while continuously maintaining a link connection for data traffic to the serving base station 211 through RF1. In this manner, it is possible to reduce a handover delay time by performing a handover procedure between the target base station 220 and the terminal 230 through RF3 while maintaining a link connection between the serving base station 211 and the terminal 230 through RF1.

Figure 3:
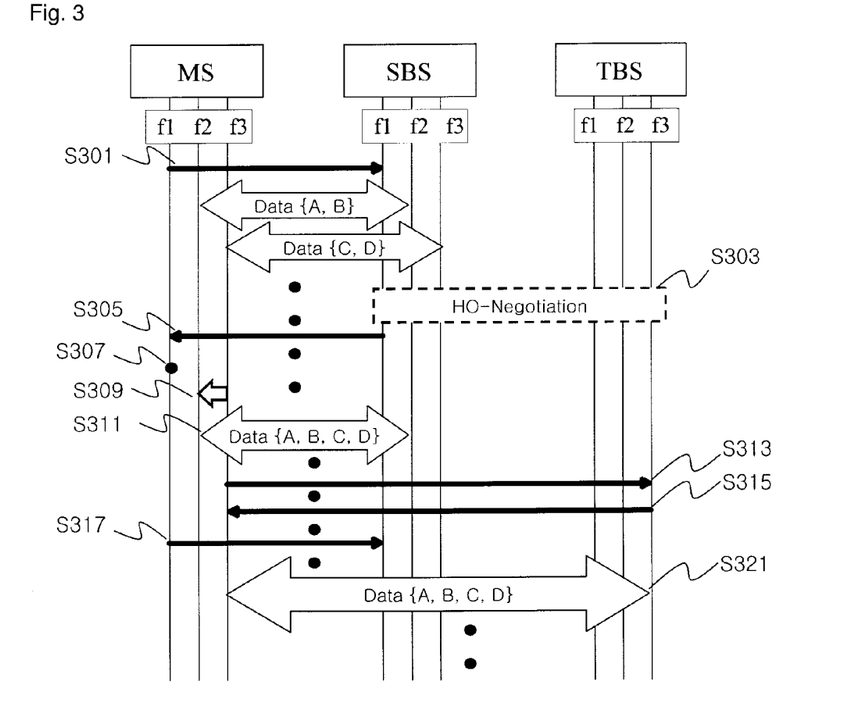
FIG. 3 shows a flow chart of a handover procedure in a multi-carrier communication system according to an embodiment of the present invention.

FIG. 3 shows a flow chart of a handover procedure in a multi-carrier communication system according to an embodiment of the present invention.

A terminal periodically receives information for a neighboring base station from a serving base station while being located in a cell currently administered by the serving base station, and periodically scans the Carrier to Interference and Noise Ratio (CINR) of a preamble signal transmitted from the neighboring base station, and thereby, the terminal recognizes that handover is required when the CINR value of a preamble signal transmitted from the serving base station is less than the CINR value of the neighboring base station.

According to an embodiment of the present invention, since the terminal supports multiple radio carriers, the terminal capable of concurrently processing multiple radio carriers may perform the scanning operation with neighboring base station using one or more of its available radio carriers without Interruption to its normal communication with the serving base station on the primary carrier and/or secondary carriers. For example, the terminal transmits a scanning request (SCN-REQ) message through a primary carrier to the serving base station, wherein the scanning request message includes the index of a secondary carrier for performing a scanning operation and scanning duration information. The serving base station, received the scanning request message, transmits a scanning response message (SCN-RSP) including the frame information for scanning start point and scanning duration information. The terminal, received the scanning response (SCN-RSP) message, continuously maintains a current link connection with the serving base station through a primary carrier while scanning neighboring base stations in the relevant frame by referring to the frame information and scanning duration information. In this manner, the terminal may continue to perform communication with the serving base station through a primary carrier, and at the same time to perform a scanning operation to the neighboring base station through secondary carrier.

When it is determined that the terminal is required to perform handover, the terminal transmits a handover request (HO-REQ) message for requesting handover to the serving base station through a first carrier (f1) (S301).

As illustrated herein, assuming that the first carrier (f1) is a primary carrier, and a second carrier (f2) and a third carrier (f3) are secondary carriers of the terminal, the HO-REQ message is transmitted to the serving base station through the primary carrier f1, and data {A, B} is transmitted and/or received to and/or from the serving base station through the secondary carrier f2, and data {C, D} is transmitted and/or received to and/or from the serving base station through the secondary carrier f3.

The HO-REQ message includes information on the IDs of neighboring base stations and CINR values for each neighboring base station on the basis of a result of scanning the CINR of a preamble signal from the neighboring base stations.

A terminal may request a temporary carrier, required for the terminal itself to perform a handover procedure to the target base station, using the HO-REQ message by selecting it in advance. The temporary carrier will be described later in the related paragraph.

The serving base station retrieves neighboring base station information and a list of target base stations to which the terminal can be handed over from the HO-REQ message received through f1, and transmits a HO-notification message to a neighboring base station included in the target base station list (S303). The neighboring base station, received the HO-notification message from the serving base station, transmits a HO-notification-response message, configured with ACK/NACK information on whether or not a handover request of the terminal is accepted and service level information provided to the terminal when the terminal is handed over, to the serving base station (S303).

As described above, when a HO-negotiation procedure (S303) through the HO-notification message and the HO-notification-response message is finished between the serving base station and target base station, the serving base station transmits a handover command (HO-CMD) message to the terminal through a first carrier (f1) (S305). The HO-CMD message includes a time expected to start a handover procedure, an ID of the target base station, a service level expected to be provided to the terminal by the target base station, and the like.

Preferably, the serving base station may allocate a temporary carrier by which the terminal performs a handover procedure to the target base station using the HO-CMD message, and may notify carrier index information on that temporary carrier to the terminal.

The temporary carrier means a carrier used when the terminal is accessed to the target base station for the first time. The temporary carrier may be a FCC-type carrier. The temporary carrier functions as a primary carrier when the terminal communicates with the target base station for the first time, but subsequent to handover, it may be also a medium for performing an intermediate role to reestablish a primary or secondary carrier. The detailed description on this will be made later with reference to FIGS. 4 through 6.

In case where a temporary carrier is requested by selecting it in advance when the terminal transmits a HO-REQ message to the serving base station, the carrier requested by the terminal may be allocated as a temporary carrier, but it may be determined by the serving base station, and notified to the terminal without requesting temporary carrier allocation by the terminal.

The temporary carrier may be allocated during a HO-negotiation procedure (S303) between a serving base station and a target base station, and notified to the terminal.

The terminal selects a target base station to which the terminal itself is handed over through the target base station information of the HO-CMD message received from the serving base station (S307). By referring to the standard by which a target base station is selected by the terminal, for example, the service level information expected to be provided to the terminal by the target base station in the HO-CMD message, the terminal may select a base station capable of providing the highest service level to the terminal itself as the target base station. In the above description, the term "service level information" means information indicating up to which level of quality of service (QoS) the service currently being provided to the terminal can be satisfied.

The temporary carrier used to perform a handover procedure between the selected target base station and the terminal as described above, may be allocated through a HO-CMD message received from the serving base station. If the selected temporary carrier is an active carrier by which data traffic is currently being transferred to and/or from the serving base station, then a carrier merge operation for securing a temporary carrier will be performed, such as switching the active carrier into a deactive carrier by which data traffic is not transferred from the serving base station, and the like (S309).

Referring to FIG. 3, the terminal is communicating with the serving base station using all of the multiple radio carriers f1, f2, and f3, and performing an initial handover procedure to the serving base station using f1 as a primary carrier, and transmitting and/or receiving data to and/or from the serving base station using f2 and f3 as secondary carriers. In this state, data {A, B} is being transmitted and/or received to and/or from the serving base station through the secondary carrier f2, and data {C, D} is being transmitted and/or received to and/or from the serving base station through the secondary carrier f3. Accordingly, there exists no available carrier capable of performing a handover procedure such as ranging or the like to the target base station, and therefore, carrier f3 is switched from an active state into a deactive state by transmitting and/or receiving data {C, D} being transmitted and/or received through the secondary carrier f3 by using the secondary carrier f2. As a result, the terminal may maintain a link connection with the serving base station while continuously performing a transmission and/or reception of data {A, B, C, D} using carrier f2, and may perform a procedure such as ranging for handover to the target base station or the like using carrier f3 that has been switched into an deactivated state.

The terminal, secured a temporary carrier for performing a handover procedure to the target base station through a carrier merge operation or the like, transmits a ranging request (RNG-REQ) message for requesting ranging to the target base station using the temporary carrier f3 (S313). Even at this time, as described above, the terminal can continuously receive a data transmission and/or reception service while maintaining a link connection with the serving base station (S311).

The RNG-REG message may perform a function of initial uplink synchronization to the target base station to which the terminal is handed over, and the terminal and target base station can make uplink synchronization with each other through the RNG-REG message.

According to another embodiment of the present invention, the ranging request message may include the index and frequency information of a primary carrier capable of transmitting and/or receiving data and control information between a target base station and a terminal, and thereby it may be determined whether or not a temporary carrier by which the terminal is currently accessed to the target base station can be continuously used as a primary carrier of the terminal, even subsequent to a ranging procedure. The temporary carrier continues to be used as a primary carrier of the terminal, even subsequent to a ranging procedure, when the index and frequency information of the primary carrier are same as the index and frequency information of the temporary carrier, and a carrier corresponding to the index and frequency information of the primary carrier is reestablished as a primary carrier of the terminal and a newly established carrier is used as a primary carrier of the terminal when the index and frequency information of the primary carrier are not same as the index and frequency information of the temporary carrier.

The target base station transmits a ranging response (RNG-RSP) message in response to the RNG-REQ message received from the terminal (S315).

The ranging response message may include the index and frequency information of a primary carrier capable of transmitting and/or receiving data and control information between a target base station and a terminal, and thereby the target base station can allocate a new primary carrier to the terminal. The terminal reestablishes a carrier corresponding to the index and frequency information on the ranging response message as a primary carrier of the terminal.

As illustrated in FIG. 3, the terminal may perform a ranging procedure for handover to the target base station, and at the same time, continuously maintain a data link connection with the serving base station through carrier f2, and thereby it is possible to stably perform handover without suspending a currently provided service.

When a handover procedure is finished between the terminal and target base station, the terminal may transmit a handover indication (HO-IND) message including target base station information (ID) or the like to the serving base station through carrier f1 to notify that the handover procedure has been successfully finished, and closes a current link connection with the serving base station (S317). As a result, carrier f2 through which data {A, B, C, D} is currently being transmitted and/or received to and/or from the serving base station is deactivated, and the terminal transmits and/or receives data {A, B, C, D} to and/or from the target base station through carrier f3 (S321).

According to an embodiment of the present invention, it is also possible to send the HO-IND message after the terminal receives the HO-CMD message from the serving base station and selects the target base station to which the terminal itself is handed over (S307) prior to performing a ranging procedure to the target base station. However, regardless of sending the HO-IND message prior to or subsequent to a ranging procedure, the terminal and serving base station may continuously maintain a data link with each other through carrier f2, and thereby it is possible to perform handover procedure without suspending a currently provided service from the serving base station.

As described above, the terminal can continue to maintain a link connection with the serving base station without suspending data transfer using multiple radio carriers, and perform a handover procedure to the target base station using an available carrier.

Figure 4:
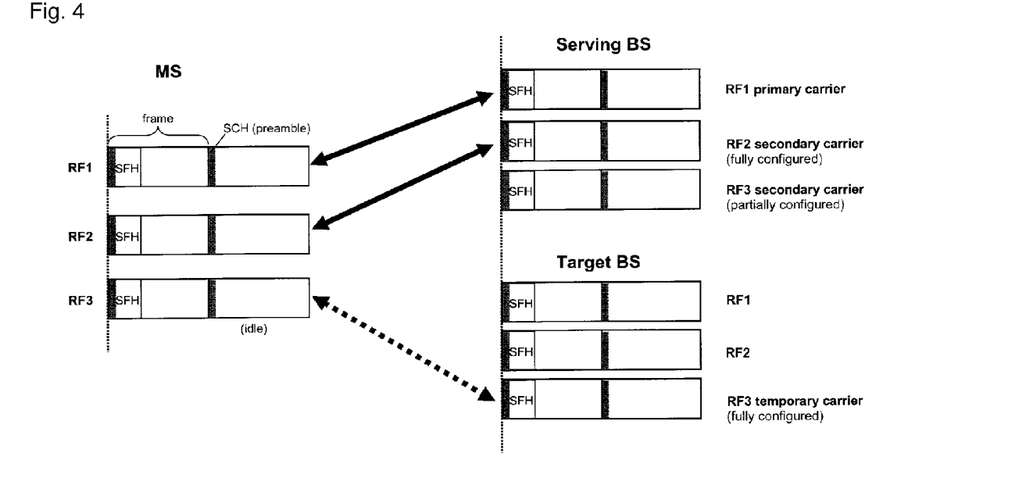
FIG. 4 shows a view conceptually explaining the function of each carrier when performing handover through a multi-carrier approach according to the present invention.

FIG. 4 shows a view conceptually explaining the function of each carrier when performing handover through a multi-carrier approach according to the present invention.

As illustrated herein, it is assumed that a terminal, a serving base station and a target base station support a multi-carrier approach, and for the sake of convenience of explanation, three radio carriers RF1, RF2, and RF3 using different RFs from one another are used. The terminal and the base station transmits and/or receives data with each other using RF1 and RF2, wherein RF1 is a primary carrier and RF2 is a secondary carrier. The RF1 and RF2 are FCC-type carriers capable of transmitting and/or receiving data traffic and PHY/MAC control information between the terminal and the serving base station. RF3 is a carrier in a deactive or idle state, and therefore, the terminal may access to the target base station using RF3, thereby performing a procedure such as ranging or the like required for handover. At this time, RF3 is a FCC-type carrier capable of transmitting and/or receiving data traffic and PHY/MAC control information between the terminal and the target base station, and it is possible to reestablish RF1 or RF2 as a new primary carrier, subsequent to finishing a handover procedure to the target base station with the RF3.

Figure 5:
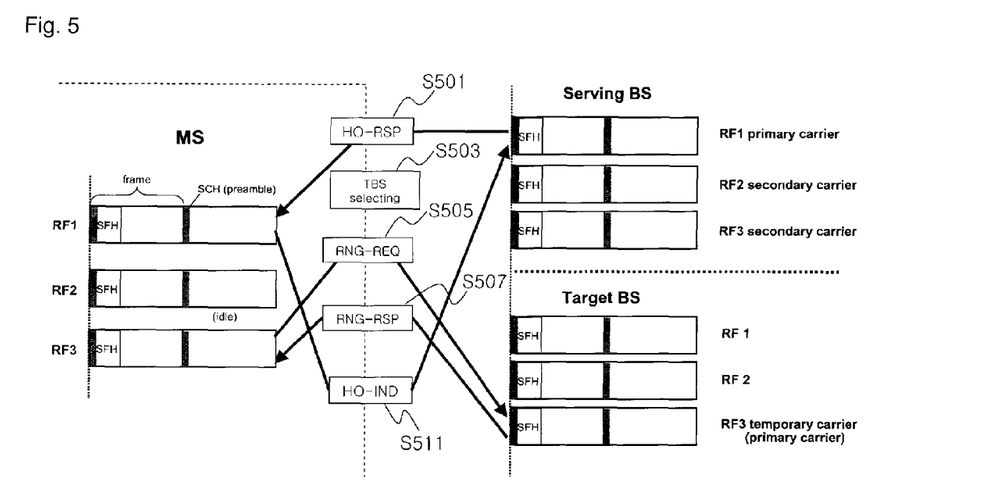
FIG. 5 shows a view conceptually explaining a handover procedure through a multi-carrier approach according to an embodiment of the present invention.

FIG. 5 shows a view conceptually explaining a handover procedure through a multi-carrier approach according to an embodiment of the present invention.

The terminal transmits a HO-REQ message to the serving base station using a primary carrier RF1, and receives a HO-CMD message that is a response to the message through RF1 (S501).

The terminal, received the HO-CMD message, selects the target base station (S503), and transmits a HO-IND message to the serving base station through RF1 (S505).

The terminal transmits an RNG-REQ message to the target base station, using RF3 being in a deactive or idle state as a temporary carrier, while continuously performing a data transmission and/or reception to and/or from the serving base station through RF2 (S507).

Here, temporary carrier RF3 functions as a primary carrier while the terminal accessing to the target base station, and the target base station, received the RNG-REQ message, transmits an RNG-RSP message to the terminal through temporary carrier RF3 (S511).

Then the link connection between the terminal and serving base station will be terminated, and a link connection will be established between the terminal and target base station using the temporary carrier as a primary carrier.

Hereinafter, an embodiment will be described in which the primary carrier of the terminal is changed from a temporary carrier to another carrier while performing a handover procedure between the terminal and target base station.

Figure 6:
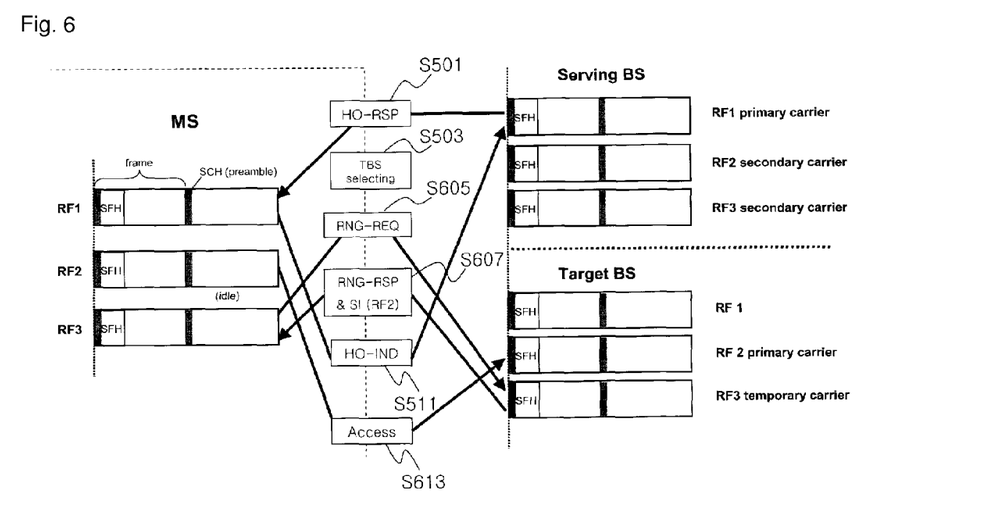
FIG. 6 shows a view conceptually explaining a handover procedure through a multi-carrier approach according to another embodiment of the present invention.

FIG. 6 shows a view conceptually explaining a handover procedure through a multi-carrier approach according to another embodiment of the present invention. According to an embodiment, as illustrated in FIG. 5, even subsequent to accessing to the target base station with a primary carrier, temporary carrier RF3 is continuously used in order to communicate with the target base station, but according to this embodiment, temporary carrier RF3 is used as a primary carrier only when accessing to the target base station for the first time, and RF2 is used as a primary carrier, subsequent to finishing a handover procedure by changing the primary carrier of the terminal to RF2 during a ranging process.

Consequently, the procedures of HO-CMD (S501), target base station selection (S503), HI-IND (S505), and the like, are similar to those of FIG. 5, and therefore, their detailed description will be omitted, and the ranging procedure will be only described below.

The terminal that has selected the target base station by receiving a HO-RSP message transmits an RNG-REQ message to the target base station by using RF3 being in a deactive or idle state as a temporary carrier while continuously performing a data transmission and/or reception to and/or from the serving base station through RF2 (S607).

If it is determined that the data transmission and/or reception to and/or from the target base station with RF2 is better than that with RF3, then the terminal may transmit the carrier index information and carrier frequency information on RF2 through the RNG-REQ message to the target base station.

The target base station, received the RNG-REQ message, grasps that RF2 has been reestablished as a primary carrier, and transmits the system information (SI) of RF2 through an RNG-RSP message (S611). The SI includes information, such as carrier index, carrier frequency, and bandwidth, and the like. In this way, the primary carrier is changed to another carrier without maintaining temporary carrier as a primary carrier, because it may be beneficial to change the carrier from the standpoint of the terminal, considering power consumption, high mobility support, quality of service (QoS) level or cell coverage, and the like.

According to still another embodiment of the present invention, it may be also possible that the target base station commands to change the primary carrier of the terminal from temporary carrier to another carrier, considering current cell capacity or service environment or the like. In other words, the target base station, received an RNG-REQ message, transmits the system information (SI) of RF2 using an RNG-RSP message in order to reestablish RF2 as a primary carrier of the terminal, for example, when determined that it is beneficial to provide a service to the terminal with RF2 than RF3 from the standpoint of a load balancing (S611). The terminal, received that information, changes the primary carrier from RF3 to RF2, and then accesses to the target base station using RF2 (S613).

The method according to the present invention as described above may be implemented by software, hardware, or a combination of both. For example, the method according to the present invention may be stored in a storage medium (for example, an internal memory of the terminal, flash memory, hard disk, and so on), and may be implemented by codes or instructions within a software program that can be performed by a processor (for example, a microprocessor within the terminal).

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

The invention claimed is:

1. A method for a handover in a wireless access system supporting a multi-carrier operation, the method performed by a mobile station (MS) and comprising:
   transmitting a handover request message to a serving base station (BS) through a primary carrier of multi-carriers, the multi-carriers including the primary carrier and one or more secondary carriers;
   receiving a handover response message including temporary carrier information indicating one of the one or more secondary carriers as a temporary carrier for the handover;
   transmitting a ranging request message through the temporary carrier while simultaneously performing data transmission with the serving BS through the primary carrier, the ranging request message for synchronizing with a target; and
   receiving a ranging response message through the temporary carrier in response to the ranging request message while simultaneously performing the data transmission with the serving BS through the primary carrier,
   wherein the primary carrier is a standalone carrier that is usable without the one or more secondary carriers, and the one or more carriers are additional carriers that is not usable without the primary carrier.

2. The method of claim 1, wherein the temporary carrier is a fully configured carrier capable of commutating data traffic and control information between the MS and the target BS.

3. The method of claim 1, wherein the ranging request message includes a carrier index and frequency information of a primary carrier of the target BS.

4. The method of claim 1, wherein the ranging response message includes information indicating whether or not the temporary carrier is used as the primary carrier after completion of the handover.

5. The method of claim 1, wherein the one of the one or more secondary carriers is configured to be in a deactivation mode in which data transmission is not performed when all of the one or more secondary carriers are in an activation mode in which data transmission is performed before starting the handover.

6. The method of claim 5, wherein the one of the one or more secondary carriers is configured as the temporary carrier in the deactivation mode.

7. The method of claim 1, further comprising:
   scanning the target BS using the one of the one or more secondary carriers while simultaneously performing the data transmission with the serving BS through the primary carrier.

8. The method of claim 1, wherein:
   the primary carrier is for transmission of data traffic and all control information; and
   the secondary carrier is for transmission of the data traffic and a portion of the control information supporting the multi-carrier operation.

9. A mobile station (MS) for supporting a handover from a serving base station (BS) to a target BS in a wireless access system supporting a multi-carrier operation, the MS is comprising:
   a radio frequency (RF) unit configured to transmit and receive signals; and
   a controller configured to:
      transmit a handover request message to the serving BS through a primary carrier of multi-carriers, the multi-carriers including the primary carrier and one or more secondary carriers;
      receive a handover response message including temporary carrier information indicating one of the one or more secondary carriers as a temporary carrier for the handover;
      transmit a ranging request message through the temporary carrier while simultaneously performing data transmission with the serving BS through the primary carrier, the ranging request message for synchronizing with the target BS; and
      receive a ranging response message through the temporary carrier in response to the ranging request message while simultaneously performing the data transmission with the serving BS through the primary carrier,
      wherein the primary carrier is a standalone carrier that is usable without the one or more secondary carriers, and the one or more carriers are additional carriers that is not usable without the primary carrier.

10. The MS of claim 9, wherein the temporary carrier is a fully configured carrier capable of commutating data traffic and control information between the MS and the target BS.

11. The MS of claim 9, wherein the ranging request message includes a carrier index and frequency information of a primary carrier of the target BS.

12. The MS of claim 9, wherein the ranging response message includes information indicating whether or not the temporary carrier is used as the primary carrier after completion of the handover.

13. The MS of claim 9, wherein the one of the one or more secondary carriers is configured to be in a deactivation mode in which data transmission is not performed when all of the one or more secondary carriers are in an activation mode in which data transmission is performed before starting the handover.

14. The MS of claim 13, wherein the one of the one or more secondary carriers is configured as the temporary carrier in the deactivation mode.

15. The MS of claim 9, wherein the controller is further configured to scan the target BS using the one of the one or more secondary carriers while simultaneously performing the data transmission with the serving BS through the primary carrier.

16. The MS of claim 9, wherein the primary carrier is for transmission of data traffic and all control information, and the secondary carrier is for transmission of the data traffic and a portion of the control information supporting the multi-carrier operation.

* * * * *